July 16, 1963 S. R. YOUNG 3,097,536
PRESSURE COMPENSATING APPARATUS
Filed Aug. 8, 1960
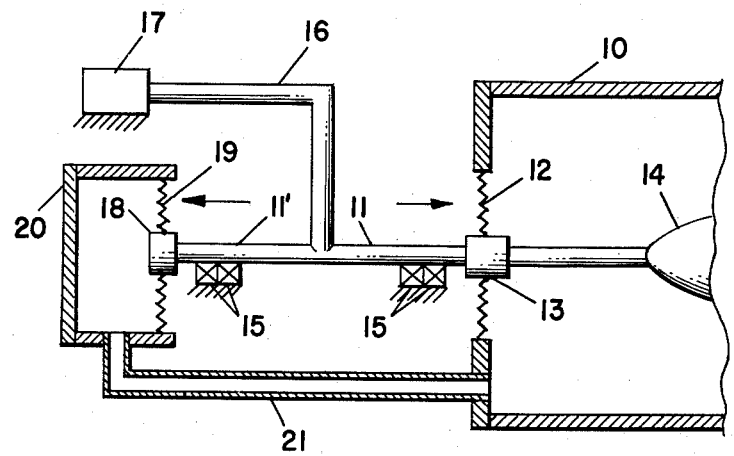
INVENTOR.
SHIRREL R. YOUNG
BY Elliott & Pastoriza
ATTORNEYS

3,097,536
PRESSURE COMPENSATING APPARATUS
Shirrel R. Young, Pico Rivera, Calif., assignor to Aeroscience, Inc., a corporation of California
Filed Aug. 8, 1960, Ser. No. 48,142
1 Claim. (Cl. 74—18.2)

This invention relates to a pressure compensating apparatus and more particularly to means for compensating undesired forces introduced into an actuating member passing through a sealing diaphragm as a consequence of transient pressure changes acting on the diaphragm.

There are many occasions in which measurements on an object are made when the object is subjected to a reduced pressure environment. For example, thrust tests of a rocket engine are often conducted in an evacuated chamber, various reaction movements on the body itself being communicated through an actuating rod or member passing from the interior of the chamber to the exterior for connection to a suitable measuring apparatus such as a load cell. To enable movement of the rod to take place, a flexible diaphragm or bellows is employed at the point that the rod passes through one wall of the chamber. Suitable corrections are then made to compensate for forces introduced as a consequence of the stiffness of the diaphragm or bellows. On the other hand, if there exists a change in the pressure differential between the pressure within the chamber and the pressure exterior of the chamber, a movement of the diaphragm will take place and be communicated to the actuating member through the connection of the diaphragm thereto. To correct such auxiliary forces constant monitoring of the pressure differential between the inside and outside of the chamber has been necessary.

With the above in mind, it is a primary object of this invention to provide an automatic compensation system which will cancel any forces introduced into an actuating member as a consequence of changes in pressure differential on either side of a diaphragm connected to the member.

More particularly, it is an object to provide a compensating apparatus which does not require special monitoring of pressure differentials but on the contrary is completely automatic in operation.

Briefly, these and other objects and advantages of this invention are attained by providing an auxiliary chamber connected to a principal or main test chamber by a conduit so that the pressure in the auxiliary chamber is exactly in correspondence with the pressure in the main chamber. Any changes in pressure differential between the main chamber and the exterior thereof will therefore also exist in the auxiliary chamber. The auxiliary chamber itself is provided with a diaphragm which is physically dimensioned and constructed to be substantially the same as the diaphragm in the main chamber through which an actuating rod or other member passes. By this arrangement, an exterior portion of such actuating rod may be connected to the auxiliary diaphragm and thus auxiliary forces introduced by the main diaphragm will be exactly counterbalanced by forces introduced by the auxiliary diaphragm to the end that cancellation of the forces resulting from pressure changes is effected.

A better understanding of the invention will be had by referring to the single drawing showing schematically one embodiment thereof.

Referring to the drawing, there is shown a main test chamber 10 from which an actuating rod or member 11 extends. As shown, there is provided a main diaphragm 12 sealed to the actuating member 11 as at 13. With this arrangement, a reduced pressure may be maintained within the chamber 10 and yet forces established in the member 11 as by a test object 14 may be transmitted from the interior to the exterior of the chamber, through the medium of the member 11 and diaphragm 12.

Movement of the actuating member 11 may be constrained in a single direction as by stabilizing flexures schematically indicated at 15. This movement may be communicated through a suitable structure 16 to a measuring instrument 17 exterior of the chamber 10.

If a change in ambient air pressure occurs or a change occurs in the reduced pressure within the chamber 10, the resulting change in the differential pressure will act on the diaphragm 12 to introduce additional forces into the member 11.

In accordance with the present invention, such additional undesired forces are compensated by connecting an exterior portion 18 of the actuating member 11 to an auxiliary diaphragm 19 disposed in one wall of an auxiliary chamber 20. The chamber 20 is connected to the main chamber 10 through an auxiliary conduit 21 so that the interior pressure in the chamber 20 is exactly the same as the interior pressure in the chamber 10. The auxiliary diaphragm 19 is made of identical size and structure to the main diaphragm 12 and is preferably positioned in opposed relationship thereto as shown.

With the above-described arrangement, it will be evident that any additional forces communicated to the actuating member 11 by the main diaphragm 12 as a consequence of changes in the pressure differential will also be applied to the member by the auxiliary diaphragm 19. Since this diaphragm is in opposed relationship to the diaphragm 12, these additional forces will be exactly cancelled. Therefore, it is not necessary to monitor the pressure differential and make compensating adjustments in the output readings of the instrument 17. The only readjustment in the output readings that must be made is to take into account the stiffness of the diaphragms 12 and 19 which is constant and not subject to variation as a consequence of pressure changes.

From the foregoing, it is thus seen that the present invention provides a completely automatic compensating system. It should be understood that the auxiliary diaphragm 19 could be connected to the structure 16 and the force measuring instrument connected to the end of the member 11. It is only necessary that the forces introduced by the diaphragm 19 be opposed to those introduced by the diaphragm 12. Thus, changes that fall clearly within the scope and spirit of the invention will occur to those skilled in the art. The compensating apparatus is therefore not to be thought of as limited to the particular schematic structure set forth merely for illustrative purposes.

While the invention has been described with respect to diaphragm type structures, it is equally applicable to bellows or equivalent pressure responsive devices in which compensation is desired. The word "diaphragm" as employed herein and in the appended claim is therefore meant to include bellows or equivalent structures.

What is claimed is:

In a force measuring system, the combination comprising: a chamber having a diaphragm sealed thereto and a connecting member passing from the interior to the exterior of said chamber through said diaphragm, said member being sealed to said diaphragm to transmit forces from an object in said chamber to measuring apparatus exterior of said chamber; and means for preventing the introduction of an additional force on said member by said diaphragm as a consequence of changes in the pressure in said chamber relative to the ambient pressure, said means including an auxiliary chamber exterior to said first mentioned chamber having an auxiliary diaphragm in opposing relationship to said first mentioned diaphragm and sealed to said auxiliary chamber, said auxiliary diaphragm being of substantially identical dimensions to said first mentioned diaphragm; means connecting an exterior portion of said member to said auxiliary diaphragm; and a conduit connecting said auxiliary chamber to said first mentioned chamber to place said chambers in communication with each other so that the chambers have identical pressures therein at all times whereby introduction of additional forces into said member as a consequence of changes in pressure within said first chamber relative to ambient pressure is prevented by identical forces transmitted to said member by said auxiliary diaphragm whereby said connecting member is only subject to forces from said object within said first mentioned chamber.

References Cited in the file of this patent

UNITED STATES PATENTS

| | | |
|---|---|---|
| 2,001,749 | Sauzedde | May 21, 1935 |
| 2,655,037 | Gess | Oct. 13, 1953 |
| 2,819,619 | Peters | Jan. 14, 1958 |
| 2,874,253 | Sharp et al. | Feb. 17, 1959 |
| 2,910,092 | Williams | Oct. 27, 1959 |
| 2,928,351 | Klingler | Mar. 15, 1960 |
| 2,932,203 | Peters | Apr. 12, 1960 |

FOREIGN PATENTS

| | | |
|---|---|---|
| 575,715 | Germany | Apr. 17, 1932 |
| 829,462 | Great Britain | Mar. 2, 1960 |